United States Patent [19]

Belcher

[11] 3,760,741
[45] Sept. 25, 1973

[54] PALLET

[75] Inventor: Samuel L. Belcher, Maumee, Ohio

[73] Assignee: Owens-Illinois, Inc., Toledo, Ohio

[22] Filed: June 14, 1971

[21] Appl. No.: 152,546

[52] U.S. Cl. .................................. 104/135, 108/51
[51] Int. Cl. ............................................. A63g 21/00
[58] Field of Search ...................... 108/51; 104/134, 104/135; 214/16.4 A, 84

[56] References Cited
UNITED STATES PATENTS

| | | | |
|---|---|---|---|
| 3,026,817 | 3/1962 | Sebastian | 104/135 |
| 2,565,740 | 8/1951 | Robertson | 214/16.4 A |
| 3,010,409 | 11/1961 | Good | 104/135 |
| 3,187,683 | 6/1965 | Schroeder | 104/135 |

*Primary Examiner*—Gerald M. Forlenza
*Assistant Examiner*—D. W. Keen
*Attorney*—Eugene F. Dwyer et al.

[57] ABSTRACT

A pallet for use in a gravity flow rack warehousing system, wherein the pallet is mounted on tracks. The pallet has a load bearing platform and a pair of supporting pads attached beneath the platform; the pads having one sloping wall and a load-bearing plate positioned on the lower surface of the platform; the plates providing a supporting contact between the pallet and the track and the sloping walls of the pads serving to guide the pallet along the tracks.

1 Claim, 3 Drawing Figures

PATENTED SEP 25 1973　　3,760,741

INVENTOR.
SAMUEL L. BELCHER
BY E.J. HOLLER +
E.F. DWYER
ATTORNEYS

PALLET

BACKGROUND OF THE INVENTION

1. Field of the Invention

A pallet for use in a gravity-feed rack type of warehousing system rides on tracks and is always in what is known as a rack-loading condition, which means that the ends are supported and the bending moments are in the middle of the platform. The pallet of this invention has pads connected to the bottom of the platform and positioned beneath the platform. The pads have at least one sloping wall and are disposed between the tracks of the rack system and guide the pallet along the track. The bottom of the platform, along a pair of parallel edges, has a load-bearing plate which provides contact between the platform and the track of the system. This pallet design provides lateral positioning on the track and a load-bearing protected area on the bottom of the pallet.

Preferred pallets are encased in a plastic cover of high-density polyethylene material, and the plates prevent puncturing the cover when the pallet is moving along the track.

2. Description of the Prior Art

Pallets utilized in warehousing have a rack-loading track, tending to be derailed when moving heavy loads. The design of this pallet insures lateral stability relative to the track, and also, the plates provide a protective contact with the track areas. In the prior art pallet, structural members of the pallet rode directly on the track and suffered damage under heavy loads.

SUMMARY OF THE INVENTION

The pallet provides a positioning means for both supporting the pallet on the track of the warehouse storage racks and for utilizing the supporting pads for guiding the pallet along the track as it is moved over the track. Some tracks may be slightly tilted from the vertical to utilize the forces of gravity to aid and assist the movement of the pallet, and pallets may be automatically directed and controlled in their movements. Prior art pallets were positioned on and above the tracks in the manner of a railway car riding upon the upper surfaces of the tracks. Lower surfaces of the platform of this pallet provide both a track contracting and load bearing surface, for supporting the pallet on the track; and the bases of the pallet, each with a sloping side, position the pallet between the tracks. The pads provide support when the pallet is on a floor or other supporting means when the pallet is handled by conventional fork lift trucks and stacked on a floor or other non-rack support.

DESCRIPTION OF THE PREFERRED EMBODIMENTS

This invention is a pallet for use in a "gravity flow rack." A flow rack utilizes the force of gravity to propel a pallet along guide tracks of a rack.

Figure 1:
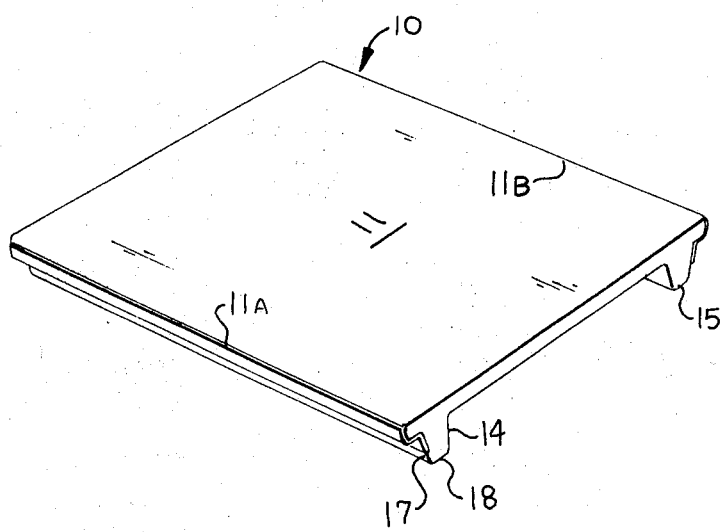
FIG. 1 is a perspective view of the pallet.

FIG. 1 shows the construction of pallet 10 comprising a load-bearing surface 11, and having a pair of parallel edges 11A and 11B and bottom surface 13.

Figure 2:
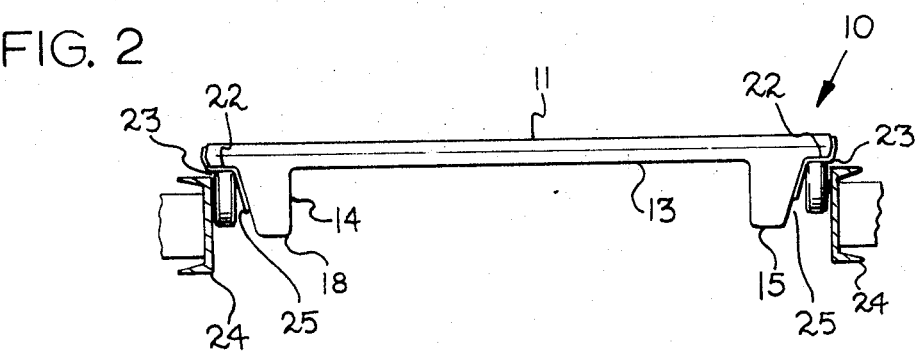
FIG. 2 is an end view, showing the pallet on a guide track.

Supporting pads 14 and 15 are positioned along one pair of edges on bottom surface 12 of the platform and positioned in a generally parallel and also spaced relationship, each pad being offset a distance from its corresponding edge of the pallet, as shown in FIGS. 1 and 2.

Pad 14 has three surfaces, sidewall 16, sloping wall 17, and bottom panel 18; the bottom panel serving to connect the walls. One sidewall of each pad is sloped and intersects its bottom panel and the platform at an angle other than the perpendicular.

Figure 3:
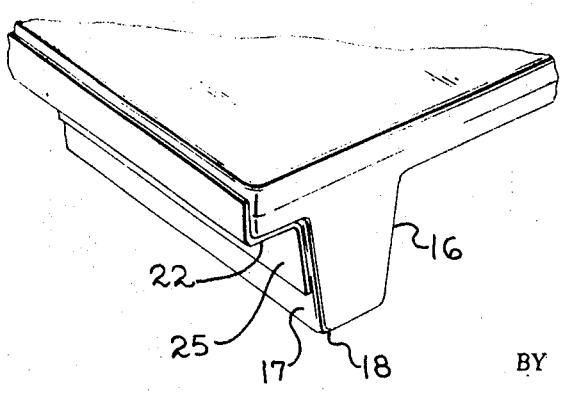
FIG. 3 is an enlarged fragmentary view of the pallet.

Rollers 23 form a track and are positioned on channels 24. Plates 22 are positioned on the bottom surface 13 of the platform and rest on the supports 23 and provide a continuous contact area for the supports 23. When pallet 10 is positioned on the track, pads 14 and 15 are positioned between the tracks 23. A guide 25 is positioned along the sloping walls as shown in FIG. 3. As pallet 10 is positioned on the track, guides 25 are between the track and are contactable with the inner surfaces of the wheels 23, and the pallet is resting on the bottom surface 22. Pallet 10 is enclosed in plastic wrapper 30.

Guides 25 protect the plastic wrapper from buffeting caused by the pallets scraping against the guide walls, and serve as means to guide the pallet along the track. The sloped wall 17 slides relative to the wheels 23 of the support track; and sloped walls of the pad act to level the pallet relative to the track, as the load increases thereon, and also to guide the pallet in response to contact with the wheels.

A portion of the bottom of the platform in the area between the base and the edge of the platform provides contact with the support means of the rack system, such as wheels 23. Plates 22, which are positioned at least at intervals along portions of each of the areas defined between the offset pads 14 and 15 and the edges of the platform 11, provide a load-bearing surface for contact with the track, the plates prevent damage to the plastic outer wrapper, under heavy loads imposed during the loading situation.

The pallet and pad of FIGS. 1 and 2 are shown in detail, in partial section, in FIG. 3. The pads comprise a shell made of rigid material, attached to and integrally formed with the reinforcement pallet.

Plates 22 and guides 25 may be either integral or separate pieces of material.

The pads 13 and 14 have a reinforcing material disposed within the pad and acting to support the pad when the pallet is resting on a floor in a load-bearing condition.

The pallet of this invention provides for both rack-loading and moving over the tracks of a rack and also for conventional fork lift operations wherein the lifts of a fork are inserted between the pads and the pallet is moved on the lifts. When the pallet is either rack-loaded or supported on a surface such as a floor, the design provides a resistance to heavy loads and especially resistance to bending moments when the pallet is rack loaded and the load is exerting a great force, tending to flex the pallet in the middle. The plates provide a guide and a protected plastic covering; a portion of the plates provide a support surface for resting on a track and also protect from damage when in a loaded condition.

What is claimed is:

1. A pallet in combination with a gravity-flow rack, said rack comprising a track and a plurality of wheels mounted thereon and forming a flow path for the pallet, said pallet comprising:
   a. a load-bearing platform having two pairs of parallel edges, a top surface and a bottom surface;
   b. supporting pads positioned along the bottom of the platform, each pad being offset a distance from its corresponding edge of the platform, and each supporting pad having a sloping wall inclined at an angle to the supporting platform;
   c. A guide positioned beneath the platform in the area between the supporting pad and the edge of the platform; and on a side of the sloping wall of each supporting pad said pad extending below the lower periphery of said wheels;
   d. said guide comprising two sections — a load-bearing section having an exposed bottom portion, positioned on the bottom of the platform in the area between the supporting pad and the edge of the platform, and a guide section positioned along the sloping wall of the supporting pads; and
   e. the exposed bottom portion of the load-bearing section contacting the upper periphery of the supporting wheels of the track, providing a pathway for movement for the pallet along the wheels, and the sloping guide section directing the pallet along the track by continuing contact between the guide section and a portion of the same wheel of the track whereby the guide section is at the same time contacting the upper periphery and a portion of the side of an individual supporting wheel of the wheel track.

* * * * *